April 9, 1968   W. R. MASON, JR   3,377,000
CONTINUOUS VOLUMETRIC DELIVERING AND METERING APPARATUS
Filed Jan. 19, 1967   2 Sheets-Sheet 1

INVENTOR
WALTER R. MASON, JR
BY MELVILLE, STRASSER, FOSTER & HOFFMAN

April 9, 1968 W. R. MASON, JR 3,377,000
CONTINUOUS VOLUMETRIC DELIVERING AND METERING APPARATUS
Filed Jan. 19, 1967 2 Sheets-Sheet 2

INVENTOR

WALTER R. MASON, JR.,

MELVILLE, STRASSER, FOSTER & HOFFMAN
ATTORNEYS.

United States Patent Office 3,377,000
Patented Apr. 9, 1968

3,377,000
CONTINUOUS VOLUMETRIC DELIVERING
AND METERING APPARATUS
Walter R. Mason, Jr., Cincinnati, Ohio, assignor to Hoge Warren Zimmermann Co., Cincinnati, Ohio, a corporation of Ohio
Filed Jan. 19, 1967, Ser. No. 610,444
10 Claims. (Cl. 222—227)

ABSTRACT OF THE DISCLOSURE

This invention resides in the discovery of new apparatus for the continuous and uniform volumetric delivering and metering of amorphous dry materials such as cement or plaster. This is achieved primarily through the use of dual conveyor tubes disposed in parallel planes, and so arranged that the metering conveyor tube feeds from the delivery tube at an intermediate point therein. Through proper designing of parts, the metering tube removes only a metered quantity of the amorphous material conveyed by the delivery tube.

The invention

While this invention is related to apparatus for the continuous and uniform volumetric delivering and metering of amorphous dry materials such as cement or plaster, it will become readily apparent to those skilled in the art by the following description that this apparatus will be suitable for metering other dry or moisture-laden material. However, for convenience, it will be described in conjunction with the delivering and metering of plaster.

In prior art devices from which dry materials have been metered on a volumetric and continuous basis, recourse has always been to a storage hopper for the source of the constant feed. The present invention is no exception; however, it avoids the problems generally associated with such prior art apparatus. The necessary storing of the material creates a problem for volumetric metering because materials such as cement or plaster compact and become more dense at the bottom of the storage hopper. With a full hopper of such material, there are varying degrees of densification. That is, a cubic inch of material taken from the bottom of a full hopper will weigh more than a cubic inch taken from the bottom of a half filled hopper. Thus, the density of the material varies directly with the changing head within the hopper.

It has been determined from observations by applicant that the head of the hopper containing material has a definite effect on the accuracy of the volumetric metering from the hopper. The statement remains true, even though the effect may be reduced, where the hopper was equipped with an agitator to churn the material and prevent bridging over the metering element. Prior attempts, to further reduce the effect of the head by maintaining a relatively constant level of material in the hopper, were not completely successful. Local compaction occurred with the hopper loading. The same problem has also been detected in batch weighing devices making it difficult to obtain a charge of very accurate weight.

It is therefore a primary object of this invention to meet the foregoing challenge of a non-uniform feed from a storage hopper and provide a unique system for the uniform and continuous volumetric metering of amorphous dry materials.

A further object of this invention is the provision of a means for such accurate and continuous volumetric metering which are independent of the material level in the storage hopper.

Another object of this invention is the provision of a means for the accurate and continuous volumetric metering of a material contained within a storage hopper but which are independent of the means by which said hopper is loaded.

A still further object of this invention is the provision of a storage hopper with a continuous cyclic conveyor system wherein the plaster-like material is drawn from said hopper in an amount in excess of that being metered, a portion thereof metered and the surplus returned to said storage hopper.

Further objects and advantages of this invention will become apparent to those skilled in the art upon reading the following description, especially when considered in conjunction with the drawing wherein.

In the practice of this invention there is provided a hopper containing a quantity of plaster, cement or similar material from which a continuously metered amount or amounts are to be withdrawn. Disposed below the hopper adjacent an opening in said hopper is a conveyor system capable of moving material withdrawn therefrom to a second substantially vertical transfer system. The second system moves the material to a point above or aside the supply hopper in some convenient manner where it is deposited in a substantially horizontal conveyor tube. The motivating means within the third transfer tube is a screw conveyor which urges the material in a direction away from the vertical transfer system. At some intermediate point in said tube, a metered quantity is continuously removed and caused to exit into a receptacle by means of a screw conveyor within the second of the two parallel tubes which is close to and communicating with the first at said intermediate point. Due to the over supply of material in the first tube, as compared with the lesser conveying capacity of the second tube, a constant metered quantity only is withdrawn thereby permitting a continuous volumetric metering of the contained material. To complete the cycle, the unmetered quantity remaining in the first tube is caused to traverse the full length of the third transfer tube and return to the supply hopper. The effect of this system is to recycle the material while at the same time metering and withdrawing a portion of it.

The accuracy of metering in the system constructed in accordance with the present invention is rendered independent of the level of material in the storage hopper so long as a minimum amount remains in said hopper. That is, the densification factor caused by the head of material in the storage hopper is discounted by the nature of this invention wherein metering takes place at a point where the material is in motion. An equilibrium is at once reached between the material being transferred in the horizontal transfer tube and that being metered in the adjacent metering screw conveyor immediately below. No densification factor operates in this system because the material is rendered homogeneous (so far as compaction is concerned) by the conveying action which brings it to the point where metering occurs. Secondly, there is no variation in head of material at the point where metering occurs.

Figure 1:
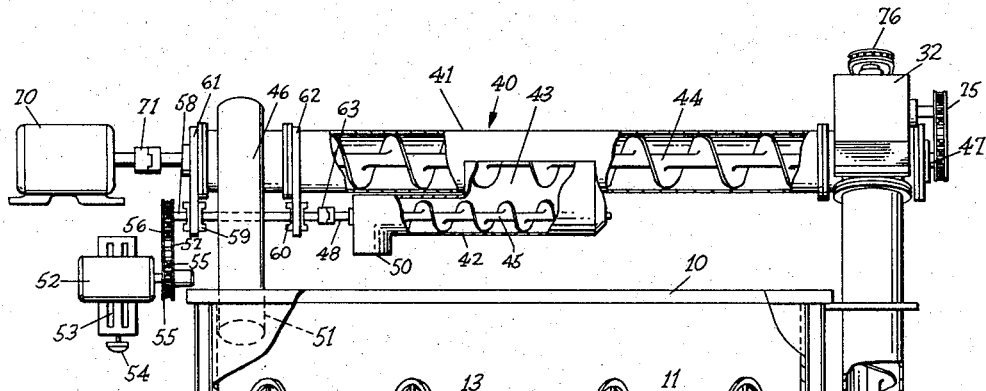
FIGURE 1 is a front elevation with parts in section and parts broken away showing the continuous metering apparatus of this invention.

Turning now to the further details of this invention, with particular reference to the figures, there is provided a supply hopper 10 within which is situated an agitator indicated generally at 11. Preferably the agitator comprises a shaft 12 surrounded by a spiral blade 13 with supports 14 as illustrated in FIGURE 1. The shaft 12 is journaled at opposite ends in bearings 15 and 16. The drive can be a motor 17 coupled at 18 to a gear reducer 19 which in turn couples to the shaft at 20. The agitator prevents material from bridging over the screw conveyor described hereinafter.

The bottom of storage hopper 10 is provided with a longitudinal opening or trench 21, adjacent to and communicating with conveyor tube 22. The conveyor tube 22, the first of four portions forming the total conveying system of this invention, initiates the transfer of the material to the second portion of said system. This transfer is effected by means of a screw conveyor 23 disposed therein. The shaft 24 of said screw conveyor 23 is journaled at its ends in bearings 25 and 26—the drive may be accomplished by motor 27, preferably one with variable speed, coupled to the shaft 24 by coupling 28. As viewed in FIGURE 1, the material moves toward the right at a predetermined rate to the second portion of the total transfer system. It should be apparent that several factors determine the quantity of material to be transferred. While not intending to impose a limitation on the invention as taught herein, conveyor tube 22 may be four inches in diameter with screw conveyor 23 having a four inch pitch, that is, four inches from slight tip to slight tip. Said conveyor may be operated in a range of speeds on the order of 40–150 r.p.m.

The purpose of the generally vertical transfer tube 30, the second portion of the total transfer system and the one receiving material from conveyor tube 23, is to move said received material to a point over the hopper 10 and to further assist in dispersing compacted portions of the material. Transfer tube 30 with screw conveyor 31, or an equivalent mechanism disposed therein, is constructed and arranged in a manner similar to conveyor tube 23. The drive may be effected by means to be described later. One limitation however is that screw conveyor 31 must rotate at a faster speed than screw conveyor 23 so that all material reaching tube 30 is immediately carried upward. To be consistent with the speed range disclosed earlier for screw conveyor 23, a speed between about 60–175 r.p.m. would suffice. It is again emphasized that said range is not a limitation on this invention. Upon reaching the delivery end 32 of conveyor tube 30, the transferred material is ready for the metering station.

The provision and arrangement of the metering station indicated generally at 40, constitutes an important and unique function of this invention. The metering station 40 comprises two conveyor tubes 41 and 42, with screw conveyors therein, lying in substantially horizontal parallel planes. Said tubes will be observed to communicate at an intermediate point 43 of tube 41. In the preferred embodiment of this invention, tube 41 is of a larger diameter and therefore possessing a greater material capacity than tube 42. While size distances are one way to control the quantity of material passing between the respective tubes, other means are available. For example, the speeds of rotation may be different, or the flight pitch of the conveyor in tube 42 may be less than in tube 41. Regardless of the means selected, the system should be operated so as to return at least forty percent of the material passing through tube 42 to hopper 10.

The material from the vertical transfer tube 30 is received at one end of tube 41 and caused to move axially of the tube by means of screw conveyor 44. At an intermediate point 43 therein, a metered quantity of material, on the order of approximately fifty percent or less, enters tube 42. The last mentioned tube, like its companion tube, has a screw conveyor 45 centrally disposed therein. The two screw conveyors 44 and 45 are journaled in bearings 46, 47 and 48, 49 respectively. It has been founnd desirable to dispose tube 42 and consequently screw conveyor 45 as close as feasible to tube 41 and screw conveyor 44 respectively, to minimize any bridging tendency that is inherent in materials such as plaster or cement. The metered material which enters tube 42 traverses said tube and exits through opening 50. An appropriate receptacle (not shown) may be provided for receiving the metered material. The excess material which bypasses intermediate point 43 continues through the full extent of tube 41 where it is caused to return to the hopper 10 via opening 51.

It will be recalled that screw conveyor 31 operates at a faster rate than screw conveyor 24. In the same manner, a further increase is found in the metering station 40. That is, screw conveyor 44 at least will be operated at a speed on the order of 80–200 r.p.m. This again insures that all material delivered by vertical tube 30 will be moved away by screw conveyor 44. The speeds of rotation of screw conveyors 44 and 45 can vary so long as other means, such as noted earlier, are employed to secure only a metered quantity. To be consistent with the dimensions noted as examples earlier, tube 41 may be four inches in diameter with screw conveyor 44 having a four inch pitch. If tube 45 is operated at the same speed, it may for example, have a tube no greater than 2 inches in diameter, and a corresponding pitch of 2 inches.

It should therefore be apparent that operating conveyors 44 and 45 at the same speed or at a constant difference, permits the use of a single drive. However, for convenience, an exemplary embodiment containing separate drives will now be described. Accordingly, screw conveyor 45 is driven by motor 52, which preferably is variable in speed. In place of a rheostat to vary the speed of motor 52, the speed may be varied by mechanical adjustment. By vertically shifting the position of motor 52 along tracks 53, such as by handle 54, the effective diameter of variable sheave 55 may be changed. In either case, sheave 55 drives sheave 56 by means of belt 57. Sheave 55 is keyed to shaft 58 which is illustrated as an extension of the shaft of screw conveyor 45. Shaft 58, in the embodiment shown in FIGURE 1, is supported in bearings 59 and 60 in supports 61 and 62 respectively. A connection such as coupling 63 may be used to join shaft 58 to screw conveyor 45.

Figure 2:
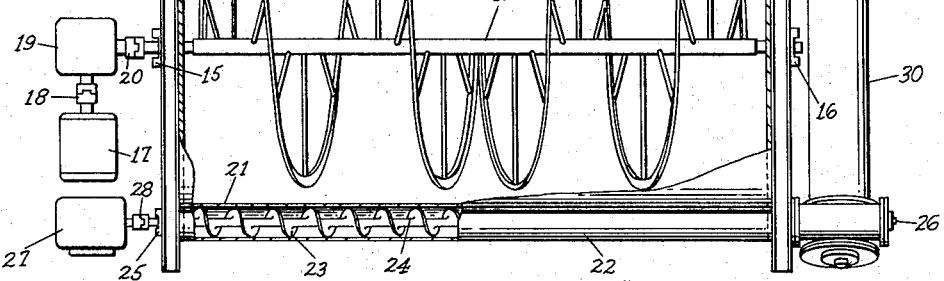
FIGURE 2 is a right side view of the system illustrated in FIGURE 1.

The drive mechanism for the second and third portions of the total conveying system may be a single unit. While screw conveyor 44 must be operated at a faster speed than screw conveyor 31, this fact does not preclude a single unit. Said screw conveyors 44 and 31 are driven by motor 70, preferably variable in speed, through coupling 71 joining motor 70 to screw conveyor 44. Adjacent the exit end of transfer tube 30 there is provided a right angled gear unit 72 having an appropriate gear reduction, which continues the drive of screw conveyor 44. FIGURE 2 illustrates this latter arrangement more clearly. Sprocket 73 keyed to the shaft screw conveyor 44 drives sprocket 74 by means of a chain or belt 75. By means of gears disposed at right angles, and through a predetermined reduction in gear unit 72, sprocket 76 is driven by sprocket 74. Screw conveyor 31 in turn is driven by belt 77 connecting sprockets 76 and 78, the latter keyed to the shaft screw conveyor 31. This arrangement thus assures the desired ratio of speeds between the respective screw conveyors.

A preferred operation of this system is as follows: A quantity of material is loaded into hopper 10. Preferably the rotation of the agitator 11 is begun prior to loading so as to avoid the problems of bridging in the hopper. By actuating conveyors 24, 31, and 44, the material in said hopper is caused to traverse conveyor tube 22 by means of screw conveyor 24 and deposited in vertical transfer tube 30. By means of screw conveyor 31 disposed in transfer tube 30, the material is brought to a point above hopper 10 where it exits into the metering station 40. The material enters the metering station through conveyor tube 41 and is caused to pass through said tube by means of conveyor 44. At the end of its passage it returns to hopper 10 by means of return chute 51. When it is desired to meter a quantity of material, screw conveyor 45 may be actuated which impels a portion of the material from conveyor tube 41 through opening 43 to the opposite end of conveyor tube 42 to exit through opening 50. Thus, all material traversing conveyor tube 41 which is not withdrawn therefrom by screw 45, continues onward and is returned to hopper 10 as surplus through chute 51.

Figure 3:
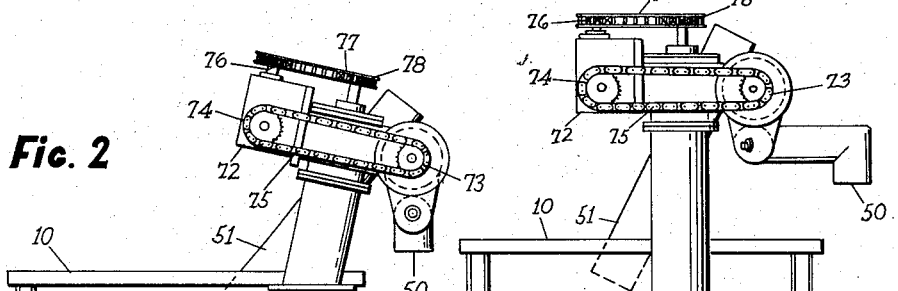
FIGURE 3 is a right side view of another embodiment illustrating a different arrangement of the metering station.
Figure 4:
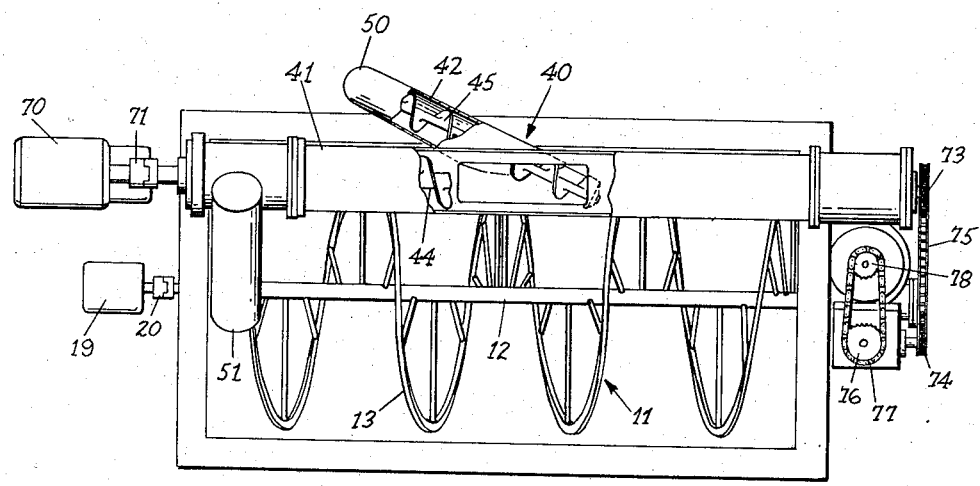
FIGURE 4 is a top view of the embodiment depicted at FIGURE 3, with parts removed.

It is to be understood that various modifications may be made in the arrangement of this system without departing from the scope and spirit of this invention. FIGURES 3 and 4 represent one modification which may be made in this invention. That is, vertical chancellor tube 30 may be substantially perpendicular to the floor with metering screw conveyor 42 skewed at an angle from conveyor tube 41. This is more evident in FIGURE 4. Further modifications may be made in the design of the screw conveyors. While screw conveyor 45 should be a solid flight conveyor for positive action in metering, all other screw conveyors can be of any design best suited to the material being handled. A further modification for the screw conveyors is the freedom in selecting either right hand or left hand to be rotated in either direction so long as the movement of the material follows the course shown and described hereinabove. The foregoing modifications are just a few examples of the changes which can be made without departing from the invention as taught herein. It is further understood that the embodiments illustrated herein are merely exemplary and not intended to be limiting on this invention except as set forth in the following claims.

The embodiments of the invention in which an exclusive property or privilege is claimed are defined as follows:

1. Apparatus for the continuous volumetric metering and delivering of amorphous material comprising a hopper for said material, means communicating with said hopper for conveying said material to a metering station, said metering station comprising an essentially horizontal transfer passage, a second transfer passage essentially horizontal and lying below said first transfer passage, communicating means between said two transfer passages at a point intermediate the length of said first passage, a positive action conveyor operating within said second transfer passage for metering and conveying a portion of said material to a discharge opening spaced from said intermediate point, means for propelling material through said first transfer passage and for returning surplus material through discharge means to said hopper, said discharge means spaced from said intermediate point, and drive means for actuating said propelling and conveying means and said conveyors.

2. The apparatus claimed in claim 1 wherein the material conveying capacity of said second transfer passage is no greater than 60% of the capacity of said first transfer passage.

3. The apparatus claimed in claim 1 wherein said drive means are variable in speed.

4. The apparatus claimed in claim 3 including agitation means disposed in said hopper and means for driving same.

5. The apparatus claimed in claim 4 wherein said transfer passages lie in parallel relationship.

6. Apparatus for the continuous volumetric metering and delivering of amorphous material from a storage hopper, a first conveying means disposed below said hopper and communicating with said hopper, an essentially vertical transfer system adjacent the discharge point of said first conveying means for receiving material therefrom, an essentially horizontal transfer system disposed generally above said hopper and communicating with said essentially vertical transfer system for receiving material therefrom, a metering tube system essentially horizontal and disposed immediately below said horizontal transfer system, a metering means comprising a common opening between said metering tube system and said horizontal transfer system at a point intermediate the length of the last named transfer system, positive delivery means in said metering tube system for metering and conveying a portion of said material from said metering means to a point of delivery spaced from said metering means, a discharge opening for returning to said hopper the surplus material which passes said metering means in said horizontal transfer system, and drive means for actuating said first conveying means, said transfer systems, and said positive delivery means.

7. The apparatus claimed in claim 6 wherein the material conveying capacity of said metering tube system is no greater than 60% of the capacity of the horizontal transfer system.

8. The apparatus claimed in claim 6 wherein said drive means are variable in speed.

9. The apparatus claimed in claim 8 including agitating and blending means disposed in said hopper and means for driving same.

10. The apparatus claimed in claim 6 wherein the said horizontal systems lie in parallel relationship.

References Cited

UNITED STATES PATENTS

| | | |
|---|---|---|
| 2,003,417 | 6/1935 | Andreas. |
| 2,573,566 | 10/1951 | Hammann _____ 222—227 X |
| 2,612,294 | 9/1952 | Dorschner _____ 222—252 |
| 2,743,860 | 5/1956 | Saxe _____ 222—412 X |
| 3,025,945 | 3/1962 | Johanningmeier ___ 222—412 X |
| 3,039,660 | 6/1962 | Anderson _____ 222—412 X |
| 3,199,731 | 8/1965 | Brauer et al. _____ 222—70 X |

FOREIGN PATENTS 439,571    6/1953    Canada.

ROBERT B. REEVES, *Primary Examiner.*

K. N. LEIMER, *Assistant Examiner.*